United States Patent [19]
Lowrey et al.

[11] Patent Number: 6,102,468
[45] Date of Patent: Aug. 15, 2000

[54] CONVERTIBLE CAMPING TRAILER

[75] Inventors: Charles H. Lowrey; John P. Inda, both of Shawnee, Okla.

[73] Assignee: General Plastics, Inc., Shawnee, Okla.

[21] Appl. No.: 08/962,925

[22] Filed: Oct. 27, 1997

[51] Int. Cl.[7] .................................................. B60P 3/355
[52] U.S. Cl. ........................... 296/173; 296/169; 296/174
[58] Field of Search .................................... 296/159, 160, 296/169, 173, 174

[56] References Cited

U.S. PATENT DOCUMENTS

| | | | |
|---|---|---|---|
| 1,568,895 | 1/1926 | Lyons . | |
| 2,003,816 | 6/1935 | Allen et al. | 296/23 |
| 2,719,054 | 9/1955 | Jennings | 296/169 |
| 3,170,724 | 2/1965 | Heil | 296/169 |
| 3,371,954 | 3/1968 | Larsson | 296/169 |
| 3,464,735 | 9/1969 | Smith | 296/169 |
| 3,608,953 | 9/1971 | Bernard | 296/27 |
| 3,701,561 | 10/1972 | Friesen | 296/169 |
| 3,917,337 | 11/1975 | Couix | 296/169 |
| 4,113,301 | 9/1978 | Olmstead | 296/169 |
| 4,263,925 | 4/1981 | Arganbright | 135/1 A |
| 4,657,299 | 4/1987 | Mahan | 296/159 |

*Primary Examiner*—Gary C. Hoge
*Attorney, Agent, or Firm*—McAfee & Taft

[57] ABSTRACT

A convertible camping trailer which may be used as a camping trailer and converted to a normal utility trailer when camping components are removed. The trailer includes a rolling chassis and a plurality of upwardly extending walls. A pair of doors are pivotally attached adjacent to upper edges of side walls of the trailer, and the doors may be pivoted between a closed position covering the trailer and an outwardly extending, substantially horizontal open position. A plurality of support arm assemblies support the doors when in the open position. Panels may be positioned adjacent to the doors and covering a portion of the compartment so that the open doors and panels form bed surfaces thereon. A tent may be positioned in a raised position covering the open doors and compartment. The trailer has a tailgate on which a step may be pivotally disposed to provide access to the trailer when the tailgate is closed. Leveling devices may be used to level the trailer when it is located at a camping site.

52 Claims, 5 Drawing Sheets

CONVERTIBLE CAMPING TRAILER

BACKGROUND OF THE INVENTION

1. Field of the Invention

This invention relates to camping trailers, and more particularly, to a collapsible camping trailer which may be converted to a normal utility trailer when the camping components are removed.

2. Description of the Prior Art

On camping trips, it is often desirable for the persons camping to utilize a camping trailer which is essentially a self-contained unit which may be used for shelter and storage. Such a trailer provides a mobile camp site which may be left in place when the campers' vehicle is moved. Camping trailers typically provide more amenities than a simple tent.

Many camping trailers are suitable only for camping and no other purpose. Therefore, much of the time they are not in use. It is desirable to have a camping trailer which may be converted into a normal utility trailer for uses other than when the camping components are removed. One such device is shown in U.S. Pat. No. 1,568,895 to Lyons. This patent shows a trailer which can be used for camping, but which can be used for other purposes when the camping components are removed. This trailer has a pair of folding box bays which fold out to form a bed. Adjustable legs support the box bays. The tailgate may include a step. This apparatus requires the use of a plurality of legs to support a top portion. The setup of this apparatus is relatively complex, and there is a need for a more simple construction. The present invention solves this problem by providing a camping trailer with camping components which are quickly and easily assembled.

U.S. Pat. No. 2,003,816 to Allen et al. discloses a camping trailer which is constructed so that its sections can be removed and the trailer used for general hauling. As with Lyons, this apparatus is relatively complex and time-consuming to assemble as a camping trailer.

U.S. Pat. No. 3,608,953 to Bernard shows a collapsible camping trailer with bed platforms which fold out horizontally and are supported by diagonally supported bed braces. The upper end of each bed brace is pivotally connected to the underneath surface of the extended bed and has a lower end which engages the chassis. This apparatus is a dedicated camping trailer and not readily convertible to a standard utility trailer.

The above-described patents require specially designed enclosures to protect the campers. A desirable objective is to eliminate some specialized components and provide a camping trailer which acts as a support for a tent of relatively conventional construction. U.S. Pat. No. 4,657,299 to Mahan shows the use of a dome-type tent assembled onto the bed of a pickup truck. While this configuration utilizes a readily available tent, the camp site may not be left in place when the vehicle is moved since the tent is actually connected to the truck itself. The present invention solves this problem by providing a camping trailer which allows a tent to be affixed thereto, and of course, the trailer may be left in place when the vehicle normally towing it is moved.

SUMMARY OF THE INVENTION

The present invention is a convertible camping trailer which may be configured in a collapsed, traveling position for towing behind a motor vehicle and erected into an open, camping position at a camp site when desired. The major camping components may be removed so that the trailer may be further converted into an open utility trailer, thereby increasing the usefulness of the apparatus.

The reconfigurable or convertible trailer may be described as comprising a chassis, a plurality of wheels mounted on said chassis to rollingly support the chassis above a ground surface, a floor on the chassis, a plurality of walls extending upwardly from the floor and defining an upwardly opening compartment, a frame detachably mounted adjacent to an upper portion of the wall, and a door hingingly attached to the frame. The door is movable between a first, closed position covering at least a portion of the upwardly opening compartment and a second, open position uncovering that portion of the compartment and extending substantially horizontally so that the door forms at least a portion of a bed surface. The walls comprise a pair of side walls and a front end wall extending between the side walls.

The apparatus further comprises a tailgate having a closed position extending between the side walls at the rear of the trailer and pivotally connected to the chassis for pivotation between the closed position and an open position. A step may be pivotally attached to the tailgate for providing access to the compartment when the tailgate is in its closed position.

Preferably, there is a support structure supporting the walls, at least along upper portions thereof. The frame is attached to this support structure.

The trailer further comprises support means for supporting the door in the second position thereof. The support means may be characterized by a plurality of support arm assemblies, each support arm assembly having a first end attached to the door and a second end attached to the chassis. More specifically, each support arm assembly comprises a rod pivotally attached to one of the chassis and door, and a sleeve pivotally attached to the other of the chassis and door. The sleeve is adapted for receiving the rod therein when the door is in the second position and disengaged from the rod when the door is in the first position. A biasing means may be used for biasing the rod toward an adjacent wall of the trailer.

In a preferred embodiment, the rod comprises an elongated portion and an end portion extending from the elongated portion. A housing is attached to the chassis, and the end portion of the rod extends into the housing. The biasing means is characterized by a spring disposed in the housing and connected to the housing and end portion of the rod so that torque is applied to the rod tending to rotate it toward the adjacent wall.

The sleeve of each support arm assembly comprises a first sleeve portion and a second sleeve portion pivotally connected to the first sleeve portion. As the door is moved from the first position to the second position thereof, an operator may position the rod and sleeve so that the rod is initially received in the first sleeve portion and subsequently received in the second sleeve portion when the first and second sleeve portions are substantially axially aligned as the door is moved.

The camping trailer may further comprise a tent having a raised position in which the tent is attachable to the door when the door is in the second position such that the door and the upwardly opening compartment are substantially covered by the tent. Preferably, the tent comprises a canopy and a pole for supporting the canopy when the tent is in the raised position. A bracket may be attached to the door, and the pole of the tent engaged with the bracket when the tent is in the raised position.

Stated in another way, the apparatus is a convertible or reconfigurable trailer comprising a chassis, a plurality of wheels mounted on the chassis for rollingly supporting the chassis on a ground surface, a floor on the chassis, a plurality of walls extending upwardly from the floor such that the walls and floors define an upwardly opening compartment, a door connected to one of the walls and pivotable between an open position covering at least a portion of the compartment and an open uncovering that portion of the compartment, and a support arm extending between the chassis and the door for supporting the door and holding the door in the open position. In the open position, the door extends substantially horizontally and outwardly from the trailer.

In a preferred embodiment, the door is one of a pair of doors which extend outwardly in opposite directions when in the open positions thereof. The trailer further comprises a plurality of bracket adapters which are positioned on a downwardly facing side of outer corners of each of the doors when the doors are in the open position and a plurality of brackets, each bracket being disposed in a corresponding one of the bracket adapters. End portions of poles of a tent may be positioned to engage the brackets for supporting a canopy of the tent when the tent is in a raised position.

Stated in still another way, the present invention provides a camping apparatus comprising a trailer defining an upwardly opening compartment, a bracket attachable to the trailer, and a tent. The tent comprises a canopy and a pole. The tent has a raised position wherein the pole is engaged with the bracket such that the canopy substantially covers the compartment of the trailer. The camping apparatus further comprises a door pivotally disposed with respect to the trailer, wherein the door has a closed position at least partially covering the compartment of the trailer and an open position extending outwardly of the trailer. The bracket is attached to the door at least when the door is in the open position. In a preferred embodiment, the door is attached to a frame which is itself detachably mounted on the trailer.

Numerous objects and advantages of the invention will become apparent as the following detailed description of the invention is read in conjunction with the drawings illustrating such embodiment.

DETAILED DESCRIPTION OF THE PREFERRED EMBODIMENT

Figure 1:
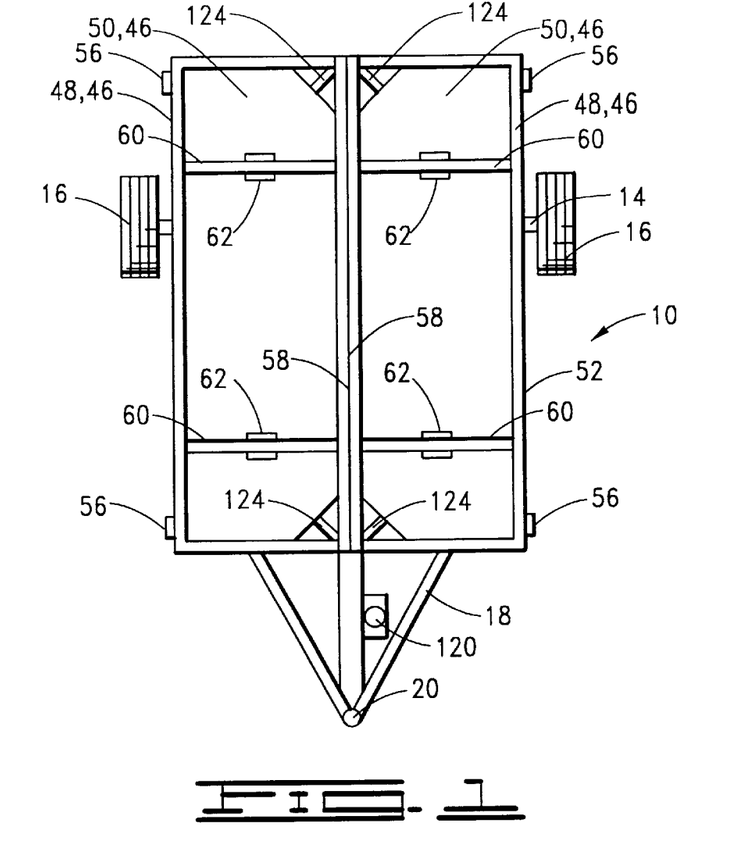
FIG. 1 is a plan view of the camping trailer of the present invention with the camping components in place and in a collapsed, traveling position.
Figure 2:
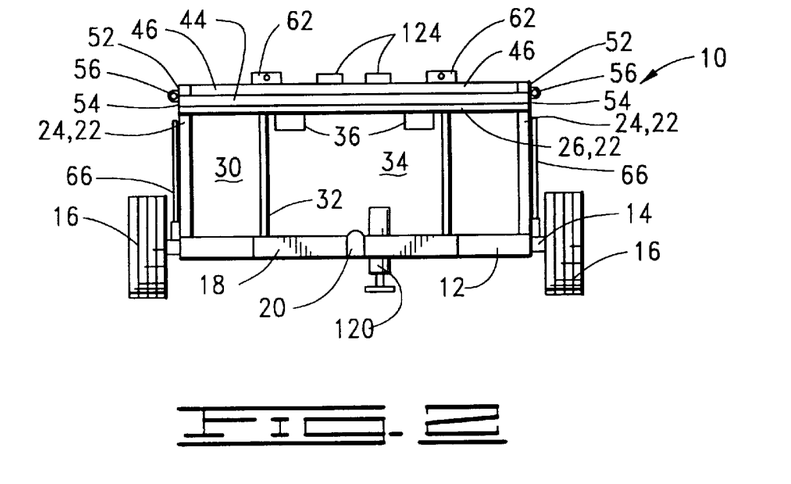
FIG. 2 is a front view of the trailer in the position of FIG. 1.

Referring now to the drawings, and more particularly to FIGS. 1 and 2, the camping trailer of the present invention is shown and generally designated by the numeral 10.

Trailer 10 comprises a chassis 12 having an axle 14 with a plurality of wheels 16 mounted thereon. A tongue portion 18 extends forwardly on chassis 12 and has a trailer hitch 20 disposed at a forward end thereof. Chassis 12, axle 14, wheel 16, tongue portion 18 and trailer hitch 20 are of conventional configuration.

A support structure 22 is attached to chassis 12. Support structure 22 includes a plurality of corner posts 24 with one of the posts located at each of the four corners of chassis 12. Support structure 22 also includes a substantially rectangular lip 26 attached to the upper ends of corner posts 24. Upper lip 26 has substantially the same outer width and length as chassis 12 not including tongue portion 18.

Figure 4:
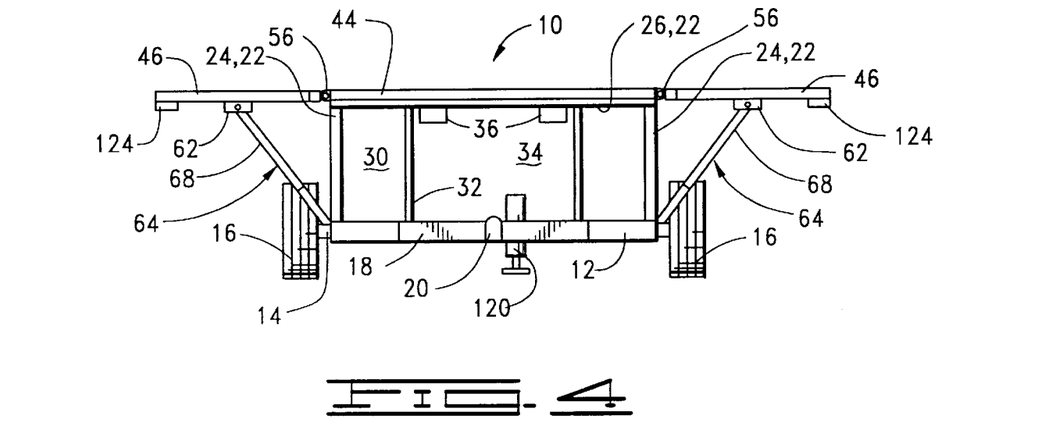
FIG. 4 is a front view of the open position shown in FIG. 3.
Figure 5:
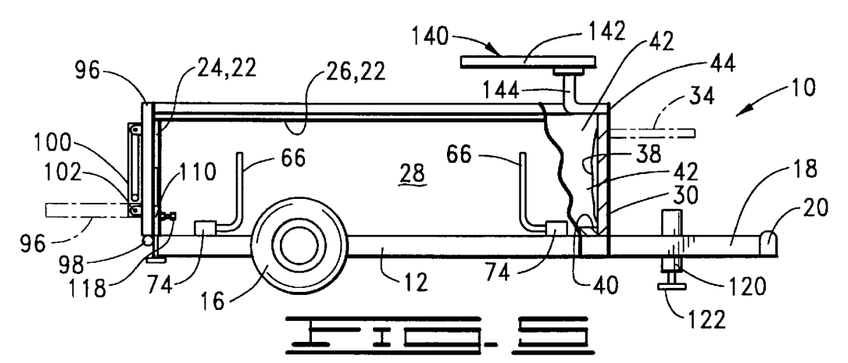
FIG. 5 is a side view of the camping trailer.

Referring now to FIGS. 2, 4 and 5, trailer 10 has a pair of longitudinally extending side walls 28 and a front end wall 30 which extends transversely at the forward end of chassis 12 between side walls 28. Side walls 28 and front end wall 30 are attached to and supported by corresponding corner posts 24, upper lip 26 and chassis 12.

A forward opening 32 is defined in front end wall 30, and a front hatch or vent 34 is disposed across opening 32 when the hatch is in a closed position. Front hatch 34 is pivotally connected to support structure 22 by hinges 36 which interconnect front hatch 34 with a front portion of upper lip 26. Front hatch 34 may be pivoted forwardly and upwardly, as shown in phantom lines in FIG. 5, to open front opening 32, thereby providing a vent for trailer 10. A mesh screen 38 may be disposed across opening 32 to prevent entry of debris and insects into trailer 10 when the front hatch 34 is in the open position.

Still referring to FIG. 5, trailer 10 has a floor 40 therein connected to frame 12 and/or support structure 22. It will be seen that floor 40, side walls 28 and front end wall 30 define an upwardly opening compartment 42 in trailer 10. Compartment 42 is in communication with front opening 32 in front end wall 30.

Referring again to FIGS. 1 and 2, a frame 44 is attached to upper lip 26 of support structure 22 adjacent to the upper portion of side walls 28 and front end wall 30. Frame 44 is generally rectangular and preferably matches the shape and size of upper lip 26 and thus has substantially the same outer width and length as frame 12 except for tongue portion 18.

As seen in FIGS. 1 and 2, a pair of elongated doors 46 are horizontally positioned adjacent to frame 44. Each door 46 has a substantially rectangular door brace 48 with a door panel 50 attached thereto. A first longitudinal edge 52 of each door 46 is pivotally connected to a longitudinal side 54 of frame 44 by a plurality of hinges 56.

Each door 46 is approximately half as wide as frame 44 so that when doors 46 are in the closed position shown in FIGS. 1 and 2, second longitudinal edges 58 of the doors generally abut one another. It will be seen that doors 46 thus cover and close an upper portion of compartment 42 when the doors are in the closed position shown in FIGS. 1 and 2.

Each door 46 includes a pair of transversely extending gussets 60. Preferably, there is a gusset 60 in each door 46 nearer the front of trailer 10 and another gusset 60 nearer the rear of trailer 10, as best seen in FIG. 1.

A sleeve bracket 62 is attached to each gusset 60 at an intermediate location thereon. Sleeve brackets 62 extend upwardly from doors 46 when the doors are in the closed position as shown in FIG. 2.

Figure 3:
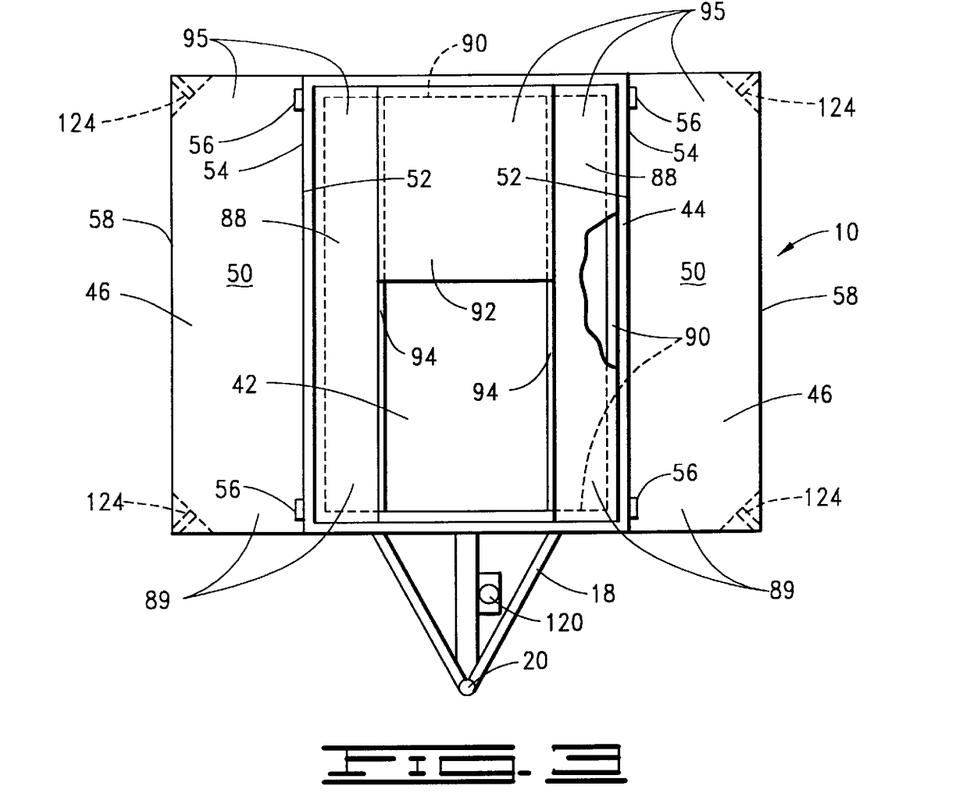
FIG. 3 is a plan view of the camping trailer with the camping components opened and assembled in an open, camping or operating position adapted to receive a tent thereon.

Doors 46 may be pivoted approximately 180° on hinges 56 so that the doors extend horizontally outwardly from frame 44, support structure 22 and chassis 12 as best seen in FIGS. 3 and 4. Thus, second longitudinal edges 58 of doors 46 face outwardly in opposite directions from trailer 10 when the doors are in this open position. Also in this open position, it will be seen that compartment 42 is opened.

Doors 46 are supported in their horizontal, open position by a plurality of support arm assemblies 64. Each support arm assembly 64 preferably extends between sleeve bracket 62 on door 46 and chassis 12. Each support arm assembly comprises a rod 66 and a sleeve 68 adapted for receiving the rod therein when door 46 is in an open position.

Figures 6, 7:
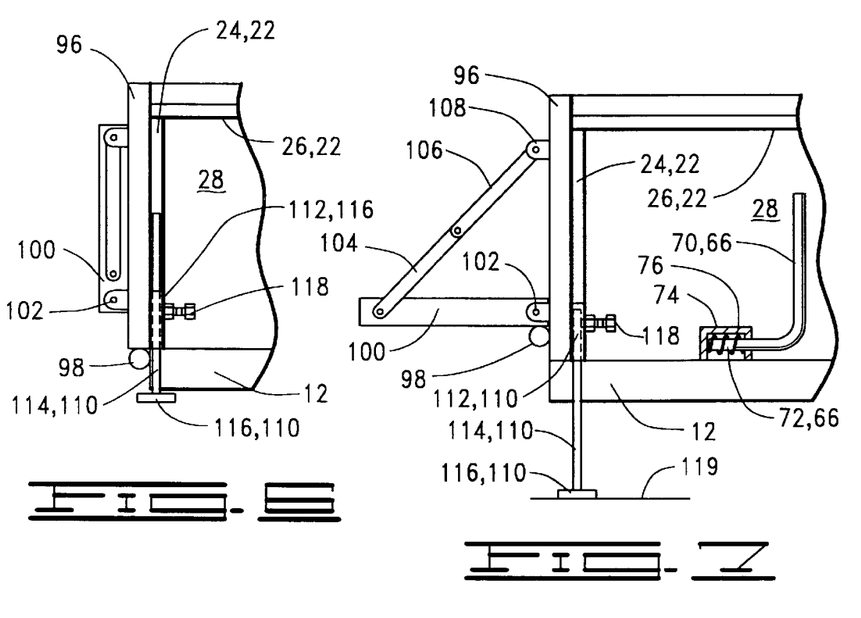
FIG. 6 is a detail of a side view at the rear of the camping trailer showing a step and leveling legs in traveling positions thereof.
FIG. 7 illustrates a detail of the side view at the rear of the apparatus showing the step and leveling leg in operating positions thereof and further showing details of a support member.

Referring to FIG. 5, a pair of rods 66 are located on each side of trailer 10 adjacent to a corresponding side wall 28. As best shown in FIG. 7, each rod 66 has an elongated portion 70 and a relatively shorter end portion 72 extending substantially perpendicularly from the corresponding elongated portion 70. Each end portion 72 extends into a housing 74 which is attached to chassis 12. A spring 76 is disposed in housing 74 and is connected to the housing and to end portion 72 of rod 66. Spring 76 is preferably a torsion-type spring which applies torque to rod 66 tending to bias the rod toward the adjacent side wall 28. Thus, when rod 66 is not in use, the elongated portion 72 thereof extends substantially vertically against side wall 28.

Figure 8:
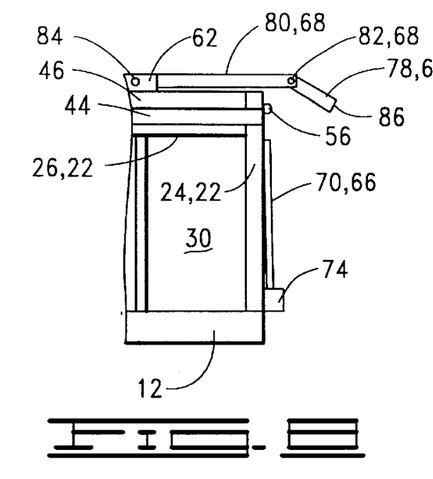
FIG. 8 is a partial rear view of the apparatus in the collapsed position.
Figure 9:
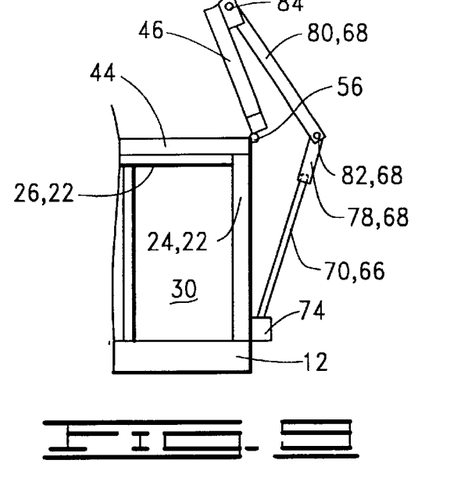
FIG. 9 is a partial rear view of the apparatus in an intermediate position between the collapsed position and the operating position.
Figure 10:
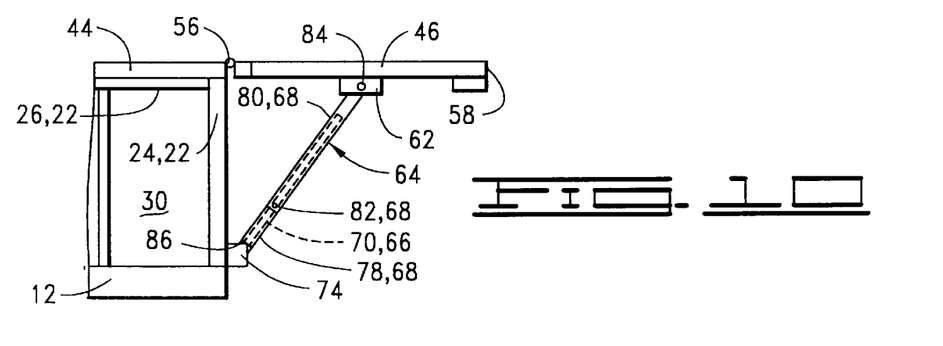
FIG. 10 is a partial rear view of the apparatus shown in the open, operating position.

Referring now to FIGS. 8–10, sleeve 68 comprises a first sleeve portion 78 and a second sleeve portion 80 pivotally connected to first sleeve portion 78 at a pivot 82. Each second sleeve portion 80 is detachably connectable to a corresponding sleeve bracket 62 by any means known in the art such as a removable pivot pin 84. When it is desired to open door 46, second sleeve portion 80 of each sleeve 68 is connected to one of sleeve brackets 62 in this manner. When door 46 is still in its closed position, it will be seen that first end portion 78 of each sleeve 68 is free. As door 46 is opened, the operator may pivot rod 66 outwardly from trailer 10 and align the rod with first sleeve portion 78 of sleeve 68 so that the distal end of rod 66 is slidably received within the first sleeve portion, as shown in FIG. 9.

As door 46 is rotated further outwardly from the intermediate position shown in FIG. 9, sleeve 68 moves downwardly along elongated portion 70 of rod 66. As this pivotation of door 46 occurs, corresponding pivotation between first portion 78 of sleeve 68 and second portion 80 of the sleeve also occurs. Eventually, first sleeve portion 78 is substantially aligned and coaxial with second sleeve portion 80 such that elongated portion 70 of rod 66 may be received within second sleeve portion 80. In the final open position of door 46, shown in FIG. 10, elongated portion 70 of rod 66 is substantially totally received within first and second sleeve portions 78 and 80 of sleeve 68. Further pivotation of door 46 is prevented by the contact of end 86 of first sleeve portion 78 with housing 74, as best seen in FIG. 10. Thus, rod 66 and sleeve 68 interact to form a rigid angular support arm assembly 64. Two such support arm assemblies 64 are preferably located on each side of trailer 10 to provide balanced, rigid support of doors 46 when the doors are in the open position thereof.

Those skilled in the art will see that the positions of rods 66 and sleeves 68 may be reversed with the rods attached to doors 46 and the sleeves attached to chassis 12.

Referring again to FIG. 3, when doors 46 are in their open position so that compartment 42 is exposed, a pair of longitudinally extending panels 88 may be positioned on frame 44, thus covering a portion of compartment 42. Panels 88 are supported on a lip 90 which extends around the inner side of frame 44. Each panel 88 is coplanar with panel 50 of door 46. The width of each panel 88 is sized such that when added to the width of door 46, a longitudinally extending bed surface 89 is defined thereby on which bedding (not shown) may be placed. It will be seen by those skilled in the art that two such bed surfaces 89 are formed in FIG. 3.

If desired, a center panel 92 may be positioned between panels 88 and supported by lips 94 formed on panel 88 and by a portion of lip 90. Thus, center panel 92 also covers a portion of compartment 42. Center panel 92 is coplanar with panels 88 and doors 46 so that a transversely extending bed surface 95 is formed by doors 46, panels 88 and center panel 92. Bedding (not shown) may be placed on bed surface 95. One such transverse bed surface 95 is shown in FIG. 3 and extends between second longitudinal sides 58 of the doors. Thus, depending upon the number of persons who will be accommodated within assembled camping trailer 10, a variety of bed configurations and arrangements are provided in the present invention.

Referring now to FIGS. 5–7, a tailgate 96 is disposed at the rear of trailer 10. Tailgate 96 is pivotally connected to the rear of chassis 12 by one or more hinges 98. Tailgate 96 extends transversely on trailer 10 so that it closes a rear side of compartment 42 in a manner generally known in the art. Tailgate 96 is shown in a closed position in FIGS. 5–6, and the tailgate is shown in phantom lines in FIG. 5 in an open position.

A step 100 is attached to tailgate 96 by pivots 102 on opposite sides of the lower portion of the tailgate. Tailgate 100 is shown in a raised, non-operative position in FIGS. 5 and 6. FIG. 7 shows step 100 pivoted downwardly 90° to a lowered, operative position. A linkage formed by first and second pivotally connected links 104 and 106, respectively, provides a support for step 100 when in the lowered position. First link 104 is pivotally connected to a distal end of step 100, and an opposite end of second link 106 is attached to an upper portion of tailgate 96 by a pivot 108. With tailgate 96 in the closed position, step 100 may be pivoted to its lowered, operative position, as seen in FIG. 7, which provides access to compartment 42 when doors 46 are open.

A telescoping leveling stand 110 is disposed on each side of trailer 10 adjacent to the rear corner posts 24. Leveling stand 110 has a leveling housing 112 attached to the rear of chassis 12. A leveling stand post 114 is slidably received in housing 112. At the lower end of each leveling stand post 114 is a foot 116 adapted for engaging a ground surface. Post 114 may be locked in any desired relative position with respect to housing 110 by a locking means, such as lock screw 118. In FIGS. 5 and 6, leveling stand 110 is shown in a non-operative, traveling position in which post 114 is raised. In FIG. 7, leveling stand 110 is shown in an operative position in which post 114 is lowered such that foot 116 engages a ground surface 119. Leveling stands 110 may be utilized to level chassis 12, and thus trailer 10, when the trailer is located at a camp site.

At the forward end of trailer 112, a trailer jack 120 is attached to tongue portion 18. Trailer jack 120 is of a conventional type known in the art having a foot 122 at the lower end thereof. By actuating trailer jack 120, such as turning a crank (not shown), foot 122 may be raised and lowered with respect to ground surface 119 for assistance in leveling.

Referring again to FIGS. 1 and 2, a bracket adapter 124 is attached to each door brace 48 in the corners adjacent to second longitudinal edges 58 thereof. Thus, there are a pair of such bracket adapters 124 for each door. When doors 46 are pivoted to their open positions shown in FIGS. 3 and 4, bracket adapters 124 are located on the lower sides of the doors near the outer corners.

Figure 11:
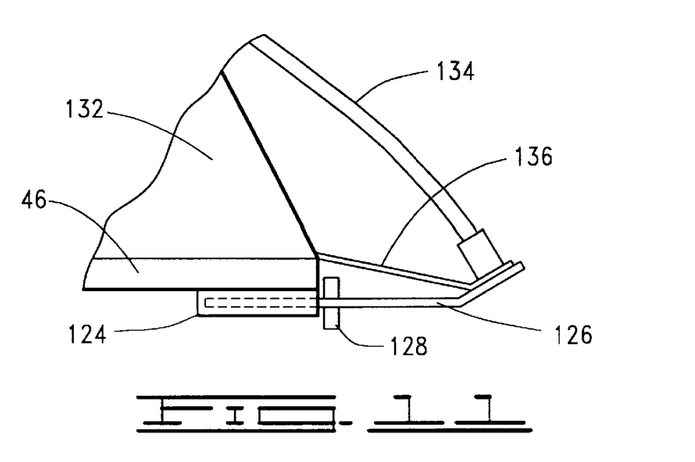
FIG. 11 shows details of a tent support bracket with a tent pole engaged therewith.

Referring now to FIG. 11, each bracket adapter 124 is adapted for receiving a tent pole bracket 126 therein. A retaining means, such as pin 128 limits the portion of bracket 126 which is received within bracket adapter 124.

Figure 12:
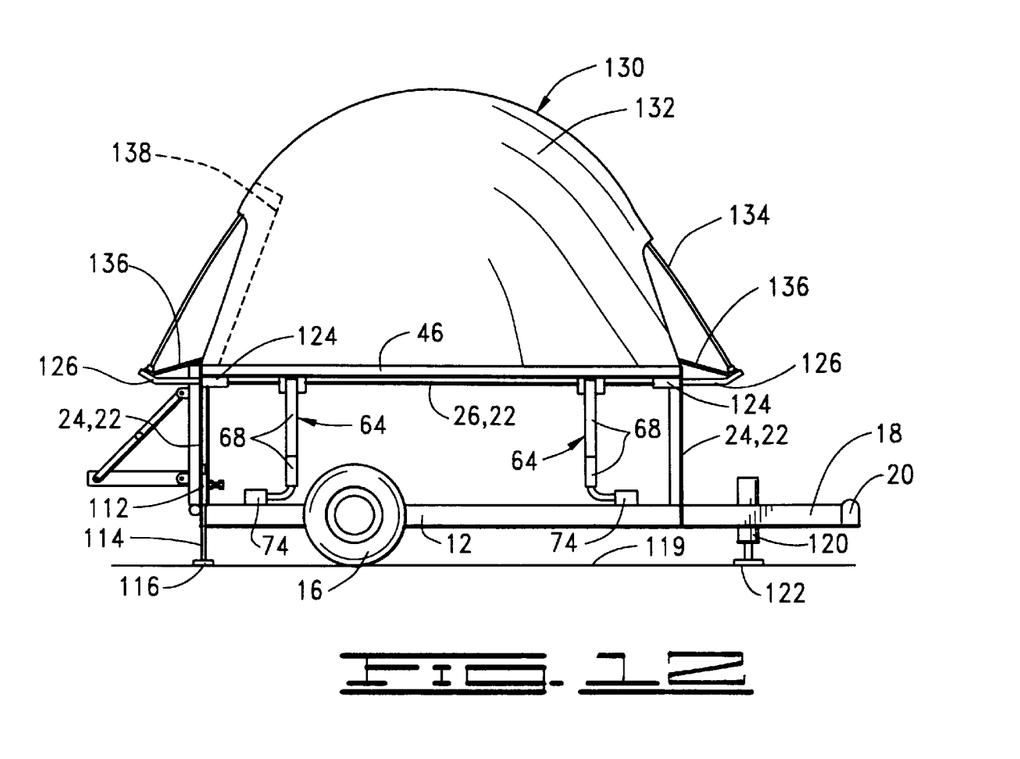
FIG. 12 is a side view of the apparatus in an operating position with a dome tent raised thereon.

Referring now to FIGS. 11 and 12, a tent 130 may be assembled atop trailer 10 when doors 46 are in the open positions thereof. Tent 130 is of generally conventional construction having a canopy 132 supported by a plurality of tent poles 134. In the embodiment shown, tent 130 is a dome-type tent with a pair of tent poles 134. Tent 130 is sized so that it substantially covers the total upper area of trailer 10, except for tongue portion 18, this area being shown in FIG. 3. The ends of poles 134 engage tent pole brackets 126, as seen in FIGS. 11 and 12. Tent pole 134 may clamp an end of a tent strap 136 against tent pole bracket 126, depending upon the construction of tent 130. Tent 130 may be a custom tent or a substantially conventional tent with the floor removed. Tent 130 preferably has a tent door 138 which is positioned so that it faces rearwardly on trailer 10.

Other accessories may be utilized with trailer 10. For example, in FIG. 5, a table 140 may be attached to trailer 10. In the illustrated embodiment, table 140 includes a table top 142 supported by an L-shaped bracket 144 attached to a forward portion of frame 44. In one embodiment, but not by way of limitation, table top 142 is formed by utilizing center panel 92. That is, center panel 92 is attached to bracket 144 and acts as table top 142, rather than as a portion of bed surface 95 as previously described. However, it is not intended that table 140 be constructed in such a manner, and a separate, specialized table top 142 may be utilized as desired.

OPERATION OF THE INVENTION

When it is desired to use trailer 10 as a camping trailer, frame 44, with doors 46 hingingly attached thereto are attached to support structure 22 as previously described. When doors 46, tailgate 96 and front hatch 34 are in the closed positions thereof, it will be seen that compartment 42 is totally enclosed. Compartment 42 may be utilized to store various components and gear, such as panels 88, center panel 92 and tent 130, along with any other items which may fit within compartment 42. Leveling stands 110 are positioned in their raised position, as is trailer jack 120. Trailer hitch 20 is connected to a ball (not shown) of a kind known in the art affixed to the vehicle (not shown) which is utilized to pull trailer 10.

Once trailer 10 is located at the desired camping location, leveling stands 110 are lowered to engage ground surface 119 to level the rear of trailer 10. Trailer jack 120 is used to level the forward portion of the trailer. Wheels 16 may be chocked if desired.

Doors 46 are opened and support arm assemblies 64 assembled, as previously described, deployed to support the doors in their open, horizontal, outwardly extending position.

Tent pole brackets 126 are fitted within each bracket adapter 124, and tent 130 is erected as previously described with tent door 138 facing rearwardly. Panels 88 and center panel 92 are positioned as previously described to form longitudinally extending or transversely extending bed surfaces 89 and/or 95, as desired.

Tailgate 96 may be opened to remove items from trailer 10 as necessary, and once those items are removed, the tailgate may be returned to its closed position.

Step 100 may be lowered to its operating position as desired to provide access to compartment 42 through tent door 138. Front hatch 34 may be opened to form a vent for fresh air into the assembled trailer as desired. Table 140 may be assembled on trailer 10 within tent 130.

It will be seen that tent 130 and trailer 10 with doors 46 in their open position, provide a complete enclosure for compartment 42 and the horizontally and/or transversely extending bed surfaces 89 and 95 previously described. With tailgate 96 in the raised, closed position and tent door 138 in a closed position, a weather-tight enclosure is substantially formed. An important aspect of the assembled apparatus 10 is that tent 130 does not have to be assembled on the ground, and the entire assembly is raised above ground surface 119 and supported by wheels 116, leveling stands 110 and trailer jack 120. Thus, even when mild flooding occurs, no water will enter tent 130.

The entire apparatus is quickly disassembled and stored again in compartment 42 for further travel.

An important aspect of the present invention is that when not being utilized as a camping trailer, frame 44, and thus doors 46, may be removed from support structure 22 so that compartment 42 is opened upwardly. In this configuration, it will be seen that trailer 10 may be utilized as a conventional utility trailer, thus making the apparatus highly versatile and economical.

It will be seen, therefore, that the convertible camping trailer of the present invention is well adapted to carry out the ends and advantages mentioned, as well as those inherent therein. While a preferred embodiment of the apparatus has been shown for the purposes of this disclosure, numerous changes may be made by those skilled in the art. All such changes are encompassed within the scope and spirit of the appended claims.

What is claimed is:

1. A reconfigurable trailer comprising:

a chassis;

a plurality of wheels mounted on said chassis to rollingly support said chassis above a ground surface;

a floor on said chassis;

a plurality of walls extending upwardly from said floor and defining an upwardly opening compartment;

a frame mounted adjacent to an upper portion of at least one of said walls; and a door hingingly attached to said frame and movable between a first position covering at least a portion of said compartment and a second position uncovering said portion of said compartment and extending substantially horizontally forming at least a portion of a bed surface, said frame being detachable from said one of said walls such that said frame and door may be removed therefrom together.

2. The trailer of claim 1 further comprising support means for supporting said door in said second position.

3. The trailer of claim 2 wherein said support means comprises a plurality of support arm assemblies, each support arm assembly having a first end attached to said door and a second end attached to said chassis.

4. The trailer of claim 1 further comprising a tent having a raised position in which said tent is attachable to said door when said door is in said second position such that said door and said compartment are substantially covered by said tent.

5. The trailer of claim 1 further comprising a telescoping leveling stand for engaging the ground surface and leveling said chassis.

6. A camping apparatus comprising:
   a trailer defining an upwardly opening compartment;
   a bracket attachable to said trailer; and
   a tent comprising:
      a canopy; and
      a pole, said tent having a raised position wherein said pole is engaged with said bracket such that said canopy substantially covers said compartment.

7. The apparatus of claim 6 further comprising a door pivotally disposed with respect to said trailer, said door having a closed position at least partially covering said compartment and an open position extending outwardly of said trailer.

8. The apparatus of claim 7 wherein said bracket is attached to said door when said door is in said open position.

9. The apparatus of claim 7 further comprising support means for supporting said door in said open position.

10. The apparatus of claim 9 wherein said support means comprises a plurality of support arm assemblies, each support arm assembly being attached to said door and to said trailer.

11. The apparatus of claim 10 wherein each of said support arm assemblies comprises:
    a rod pivotally attached to said trailer; and
    a sleeve pivotally attached to said door, said sleeve being adapted for receiving said rod therein when said door is in said open position and disengaged from said rod when said door is in said closed position.

12. The apparatus of claim 11 further comprising biasing means for biasing said rod toward a side of said trailer.

13. The apparatus of claim 12 wherein:
    said rod comprises:
       an elongated portion; and
       an end portion extending from said elongated portion; and
    said biasing means comprises:
       a housing attached to said trailer, said housing being adapted for receiving said end portion of said rod therein; and
       a spring disposed in said housing and adapted for engagement with said end portion of said rod and said housing such that torque is applied to said rod.

14. The apparatus of claim 11 wherein:
    said sleeve comprises:
       a first sleeve portion; and
       a second sleeve portion pivotally connected to said first sleeve portion;
    wherein, said rod is initially receivable in said first sleeve portion and thereafter receivable in said second sleeve portion when said first and second sleeve portions are substantially axially aligned as said door is opened.

15. The apparatus of claim 7 wherein said door is attached to a frame detachably mounted on said trailer.

16. The apparatus of claim 6 wherein said trailer comprises:
    a tailgate having an open position defining a rear opening of said compartment and a closed position; and
    a step attached to said tailgate for facilitating entry into said compartment when said tailgate is in said closed position.

17. The apparatus of claim 16 wherein said step is pivotally attached to said tailgate.

18. The apparatus of claim 6 further comprising a leveling stand for leveling said trailer at a camping site.

19. A reconfigurable trailer comprising:
    a chassis;
    a plurality of wheels mounted on said chassis for rollingly supporting said chassis on a ground surface;
    a floor on said chassis;
    a plurality of walls extending upwardly from said floor such that said walls and floor define an upwardly opening compartment;
    a door connected to one of said walls and pivotable between a closed position covering at least a portion of said compartment and an open position uncovering said portion of said compartment, said door extending substantially horizontally when in said open position; and
    a support arm extending between said chassis and said door for supporting said door and holding said door in said open position, said support arm comprising:
       a rod pivotally attached to one of said chassis and said door; and
       a sleeve pivotally connected to the other of said chassis and said door, said sleeve being adapted for receiving a portion of said rod therein when said door is in said open position and being disengaged from said rod when said door is in said closed position.

20. The trailer of claim 19 wherein said sleeve comprises:
    a first sleeve portion; and
    a second sleeve portion pivotally connected to said first sleeve portion;
    wherein, as said door is moved from said closed position to said open position:
       said rod is initially received in said first sleeve portion; and
       said first and second sleeve portions are subsequently substantially axially aligned such that said rod is received in said second sleeve portion.

21. The trailer of claim 20 wherein:
    said rod is pivotally connected to said chassis; and
    further comprising biasing means for biasing said rod against an adjacent one of said walls.

22. The apparatus of claim 21 wherein said rod comprises:
    an elongated portion; and
    an end portion extending from said elongated portion; and
    said biasing means comprises:
       a housing attached to said chassis and adapted for receiving said end portion of said rod therein; and
       a spring disposed in said housing and adapted for engagement with said end portion of said rod and with said housing such that torque is applied to said end portion of said rod.

23. The apparatus of claim 20 wherein said second sleeve portion is pivotally connected to said door.

24. The apparatus of claim 20 wherein said first sleeve portion is relatively shorter than said second sleeve portion.

25. The apparatus of claim 19 wherein said door is removable from said one of said walls.

26. A camping trailer comprising:
a chassis;
a plurality of wheels mounted on said chassis to rollingly support said chassis above a ground surface;
a floor on said chassis;
a plurality of walls extending upwardly from said floor and defining an upwardly opening compartment;
a frame detachably mounted adjacent to an upper portion of at least one of said walls;
a pair of doors hingingly attached to said frame and movable between a closed position covering at least a portion of said compartment and an open position uncovering said compartment, said doors extending substantially horizontally outwardly when in said open position; and
a plurality of support arms for supporting said doors in said open position thereof, at least one support arm extending between said chassis and each of said doors.

27. The trailer of claim 26 further comprising a support structure having a lip extending adjacent to upper edges of said walls, wherein said frame is attached to said lip.

28. The trailer of claim 26 further comprising a panel positionable adjacent to at least one of said doors when said one of said doors is in said open position such that said one of said doors and said panel form a longitudinally extending bed surface.

29. The trailer of claim 28 wherein said panel covers at least a portion of said compartment when positioned adjacent to said one of said doors.

30. The trailer of claim 26 further comprising a center panel positionable between said doors when said doors are in said open position such that said doors and said center panel form a transversely extending bed surface.

31. The trailer of claim 30 wherein said center panel covers at least a portion of said compartment when positioned between said doors.

32. The trailer of claim 30 further comprising a bracket attached to one of said walls;
wherein, said center panel is attachable to said bracket in a position higher than said doors to form a table top.

33. The trailer of claim 26 wherein said walls comprise a pair of side walls and an end wall extending between said side walls; and
further comprising a tailgate pivotally connected to said chassis and having a closed position extending between said side walls and an open position; and
a step attached to said tailgate.

34. The trailer of claim 33 further comprising a vent disposed in at least one of said walls.

35. The trailer of claim 26 wherein each of said support arms comprises:
a rod pivotally connected to said chassis; and
a sleeve pivotally connected to a corresponding one of said doors;
wherein each of said sleeves is adapted for receiving a portion of a corresponding rod therein when said doors are in said open position and being disengaged from said corresponding rod when said doors are in said closed position.

36. The trailer of claim 35 wherein each of said sleeves comprises:
a first sleeve portion; and
a second sleeve portion pivotally connected to said first sleeve portion;
wherein, as said doors are moved from said closed position to said open position:
each of said rods is initially received in a corresponding one of said first sleeve portions; and
each of said first sleeve portions are subsequently substantially axially aligned with a corresponding one of said second sleeve portions such that the corresponding rod is further received in said second sleeve portion.

37. The trailer of claim 36 wherein each of said rods comprises:
an elongated portion; and
an end portion extending from said elongated portion; and
further comprising:
a plurality of housings attached to said chassis, each housing being adapted for receiving the end portion of one of said rods therein; and
a plurality of springs, each of said springs being disposed in one of said housings and adapted for engagement with the corresponding end portion of the corresponding rod such that torque is applied to said end portions of said rods for biasing said rods toward an adjacent wall.

38. The trailer of claim 26 further comprising:
a plurality of bracket adapters, each of said bracket adapters being positioned adjacent to outer corners of each of said doors such that said bracket adapters face downwardly when said doors are in said open position; and
a plurality of brackets, each of said brackets being engaged with a corresponding one of said bracket adapters.

39. The trailer of claim 38 further comprising a tent, said tent comprising:
a canopy; and
a plurality of poles;
said tent having a raised position in which end portions of said poles engage said brackets for supporting said canopy when said tent is in said raised position, said tent substantially covering said compartment and said doors when in said raised position.

40. The trailer of claim 26 further comprising a leveling stand adapted for leveling said chassis.

41. A reconfigurable trailer comprising:
a chassis;
a plurality of wheels mounted on said chassis to rollingly support said chassis above a ground surface;
a floor on said chassis;
a plurality of walls extending upwardly from said floor and defining an upwardly opening compartment, said walls comprising a pair of side walls and an end wall extending between said side walls;
a tailgate having a closed position extending between said side walls and pivotally connected to said chassis for pivotation between said closed position and an open position;
a step attached to said tailgate for providing access to said compartment;
a frame detachably mounted adjacent to an upper portion of at least one of said walls; and
a door hingingly attached to said frame and movable between a first position covering at least a portion of said compartment and a second position uncovering said portion of said compartment and extending substantially horizontally forming at least a portion of a bed surface.

42. The trailer of claim 41 wherein said step is pivotally attached to said tailgate.

43. A reconfigurable trailer comprising:

a chassis;

a plurality of wheels mounted on said chassis to rollingly support said chassis above a ground surface;

a floor on said chassis;

a plurality of walls extending upwardly from said floor and defining an upwardly opening compartment;

a support structure supporting said walls;

a frame detachably mounted to said support structure adjacent to an upper portion of at least one of said walls; and a door hingingly attached to said frame and movable between a first position covering at least a portion of said compartment and a second position uncovering said portion of said compartment and extending substantially horizontally forming at least a portion of a bed surface.

44. A reconfigurable trailer comprising:

a chassis;

a plurality of wheels mounted on said chassis to rollingly support said chassis above a ground surface;

a floor on said chassis;

a plurality of walls extending upwardly from said floor and defining an upwardly opening compartment;

a frame detachably mounted adjacent to an upper portion of at least one of said walls;

a door hingingly attached to said frame and movable between a first position covering at least a portion of said compartment and a second position uncovering said portion of said compartment and extending substantially horizontally forming at least a portion of a bed surface; and a panel positionable over a portion of said compartment and adjacent to said door when said door is in said second position such that said panel forms another portion of said bed surface.

45. A reconfigurable trailer comprising:

a chassis;

a plurality of wheels mounted on said chassis to rollingly support said chassis above a ground surface;

a floor on said chassis;

a plurality of walls extending upwardly from said floor and defining an upwardly opening compartment;

a frame detachably mounted adjacent to an upper portion of at least one of said walls;

a door hingingly attached to said frame and movable between a first position covering at least a portion of said compartment and a second position uncovering said portion of said compartment and extending substantially horizontally forming at least a portion of a bed surface; and support means for supporting said door in said second position, said support means comprising a plurality of support arm assemblies, each support arm assembly having a first end attached to said door and a second end attached to said chassis, and each of said support arm assemblies comprising:

a rod pivotally attached to one of said chassis and door; and a sleeve pivotally attached to the other of said chassis and door, said sleeve being adapted for receiving said rod therein when said door is in said second position and disengaged from said rod when said door is in said first position.

46. The trailer of claim 45 further comprising biasing means for biasing said rod toward an adjacent wall.

47. The trailer of claim 46 further comprising:

a housing attached to said chassis;

wherein:

said rod comprises an elongated portion; and an end portion extending from said elongated portion and into said housing; and said biasing means is characterized by a spring disposed in said housing and connected to said housing and said end portion of said rod.

48. The trailer of claim 45 wherein: said sleeve comprises:

a first sleeve portion; and a second sleeve portion pivotally connected to said first sleeve portion;

wherein, said rod is initially received in said first sleeve portion and subsequently received in said second sleeve portion when said first and second sleeve portions are substantially axially aligned as said door is moved from said first position to said second position thereof.

49. A reconfigurable trailer comprising:

a chassis;

a plurality of wheels mounted on said chassis to rollingly support said chassis above a ground surface;

a floor on said chassis;

a plurality of walls extending upwardly from said floor and defining an upwardly opening compartment;

a frame detachably mounted adjacent to an upper portion of at least one of said walls;

a door hingingly attached to said frame and movable between a first position covering at least a portion of said compartment and a second position uncovering said portion of said compartment and extending substantially horizontally forming at least a portion of a bed surface;

a bracket attachable to said door; and a tent having a raised position in which said tent is attachable to said door when said door is in said second position such that said door and said compartment are substantially covered by said tent, said tent comprising:

a canopy; and a pole for engaging said bracket and supporting said canopy when said tent is in said raised position.

50. A reconfigurable trailer comprising:

a chassis;

a plurality of wheels mounted on said chassis for rollingly supporting said chassis on a ground surface;

a floor on said chassis;

a plurality of walls extending upwardly from said floor such that said walls and floor define an upwardly opening compartment;

a door connected to one of said walls and pivotable between a closed position covering at least a portion of said compartment and an open position uncovering said portion of said compartment, said door extending substantially horizontally when in said open position;

a support arm extending between said chassis and said door for supporting said door and holding said door in said open position;

a tailgate extending between an opposite pair of side walls, said tailgate being pivotally connected to a rear portion of said chassis; and a step pivotally attached to said tailgate for facilitating entry into said compartment when said tailgate is in a closed position.

51. A reconfigurable trailer comprising:

a chassis;

a plurality of wheels mounted on said chassis for rollingly supporting said chassis on a ground surface;

a floor on said chassis;

a plurality of walls extending upwardly from said floor such that said walls and floor define an upwardly opening compartment;

a pair of doors connected to opposite walls and pivotal between a closed position covering at least a portion of said compartment and an open position uncovering said portion of said compartment, said doors extending substantially outwardly in opposite directions when in said open position thereof;

a plurality of bracket adapters, each bracket adapter being positioned on an outwardly facing side of outer corners on each of said doors when said doors are in said open position;

a plurality of brackets, each bracket being disposed in a corresponding one of said bracket adapters; and support arms extending between said chassis and said doors for supporting said doors and holding said doors in said open positions.

52. The apparatus of claim 51 further comprising a tent having a canopy and a plurality of poles, said tent having a raised position in which end portions of said poles engage said brackets for supporting said canopy when said tent is in said raised position.

* * * * *